(12) United States Patent
Maurice

(10) Patent No.: US 6,527,233 B2
(45) Date of Patent: Mar. 4, 2003

(54) DEVICE FOR CLAMPING A SHAFT

(75) Inventor: Kevin L. Maurice, Bristol, CT (US)

(73) Assignee: Inertia Dynamics, Inc., Collinsville, CT (US)

( * ) Notice: Subject to any disclaimer, the term of this patent is extended or adjusted under 35 U.S.C. 154(b) by 0 days.

(21) Appl. No.: 09/841,507

(22) Filed: Apr. 24, 2001

(65) Prior Publication Data

US 2002/0153459 A1 Oct. 24, 2002

(51) Int. Cl.[7] ................................................ F16L 3/08
(52) U.S. Cl. ...................... 248/74.4; 248/74.1; 403/338; 403/373
(58) Field of Search .............................. 248/74.1, 74.4, 248/74.2, 205.3, 49; 24/458; 74/551.1, 551.2, 551.3, 551.8; 403/373, 338, 374.1, 374.2, 374.3; 411/539, 433

(56) References Cited

U.S. PATENT DOCUMENTS

| | | | | | |
|---|---|---|---|---|---|
| 2,326,941 | A | * | 8/1943 | Heitner | 403/373 |
| 2,890,848 | A | * | 6/1959 | Johnson et al. | 248/74.4 |
| 4,020,531 | A | * | 5/1977 | Ahrens et al. | 24/284 |
| 4,488,696 | A | * | 12/1984 | Sauber | 248/74.1 |
| 4,709,729 | A | * | 12/1987 | Harrison | 138/99 |
| 4,783,030 | A | * | 11/1988 | Buerhop | 248/74.4 |
| 5,147,614 | A | * | 9/1992 | Conrad | 422/186.18 |
| 5,368,594 | A | | 11/1994 | Martin et al. | 606/61 |
| 5,732,744 | A | * | 3/1998 | Barr et al. | 248/74.4 |
| 5,881,606 | A | * | 3/1999 | Roddy | 74/551.3 |
| 6,035,741 | A | * | 3/2000 | Krizman, Jr. | 74/551.8 |

* cited by examiner

Primary Examiner—Leslie A. Braun
Assistant Examiner—Tan Le
(74) Attorney, Agent, or Firm—Cummings & Lockwood LLC

(57) ABSTRACT

A clamping system is disclosed and includes a hollow shaft for interlocking with a shaft. The hollow shaft is integral with a device so that when the hollow shaft and the shaft are coupled, the device rotates therewith. The hollow shaft has slots to allow a two-piece clamping mechanism to simultaneously contact the hollow shaft and the shaft to accomplish the desired coupling. The clamping mechanism includes two shells with mating surfaces and wing portions for generating compressive force to couple the mating surfaces to the hollow shaft and the shaft.

24 Claims, 11 Drawing Sheets

DEVICE FOR CLAMPING A SHAFT

BACKGROUND OF THE INVENTION

The present disclosure relates generally to collars for power transmission, and more particularly to an improved collar system for attaching components to a rotating drive shaft.

A basic component in the power transmission industry is the shaft collar. The importance of shaft collars is demonstrated through their widespread use in the industry. Shaft collars are used for various applications including mechanical stops, locating components and bearing spacers. Shaft collars are frequently accessories to other components to create assemblies for many types of power transmission equipment including motors and gearboxes. Shaft collars and couplings are used to attach components such as gears, sprockets and pulleys to shafts in applications when high amounts of torque are transmitted. As a result of such wide spread use, shaft collars have become well understood in the art.

Traditional shaft collars have utilized perpendicular set screws to generate coupling force, as the screw is tightened onto the shaft. The amount of coupling force applied by the screw varied according to the material and condition of the shaft to which the collar was connected. Preferably, in the past, the shaft had been made of a softer material than that of the set screw to allow the set screw point to impinge into the shaft. The impingement maintained the set screw and collar in position under torque and axial loads. However, the impingement of the set screw damaged the shaft by creating an eruption of material around the set screw point, i.e. a raised burr on the surface of the shaft. This raised burr made it difficult to remove the collar from the shaft for replacement. Further, small angular or lateral adjustments were difficult if not impossible since the set screw point tends to seat back to the center of the original impingement.

In view of the above, several systems have been developed to improve set screw shaft collars. For example, some prior shaft collars had keyways for better holding power and more precise alignment. These keyways prevented rotational slippage on the shaft and created a positive drive for better torque transmission. Shaft collars with keyways were frequently used as components in handles, levers and the like. In linear applications, shaft collars often served as mechanical stops and spacers on keyed shafts. Shaft collars with keyways also increased stiffness and improved the alignment of thin keyed shaft elements such as pulleys and the like. Further, shaft collars with keyways held a fixed location on the shaft to allow for interchanging components thereon.

An alternative to set screw collars was clamp style shaft collars. Clamp style collars solved some of the problems that existed with the traditional set screw collars. Clamp style collars utilized screws to create the compressive forces that close the collar onto the shaft, thereby locking the clamp collar in position. When using clamp style shaft collars, the shaft was not damaged because set screws were not used. Clamp collars can be removed and adjusted. In addition, the holding performance of the clamp collars was improved over set screw collars because the holding power of the clamp collar did not depend on the impingement of the screw. Thus, shaft material was a relatively minor factor in how well a clamp collar performed. When the clamp collar screws were tightened, the screws closed the collar onto the shaft, creating a uniform distribution of forces around the circumference of the shaft.

One-piece clamp collars included a split ring with a threaded hole to receive a single screw. One-piece clamp collars used a portion of the force generated by the screw to compress the collar around the shaft. While set screw collars and one-piece clamp collars must slide over the end of a shaft, two-piece clamp collars can be disassembled and installed in position without having to remove other components from the shaft. Two-piece collars more efficiently use force than a one-piece clamp collar designs because they used the full force generated by the screws to apply clamping forces to the shaft.

Although clamp type collars worked very well under relatively constant loads, shock loads were known to cause the collar to shift position on the shaft. Further, in some applications, undesirable backlash was present. For applications with the above type problems, an undercut on the shaft was made. A two-piece clamp collar can be adapted and configured to mate with the undercut portion to create a positive stop that was more resistant to shock loads. In the case of an undercut shaft, a one-piece collar would have to be pried open to fit initially over the shaft and a set screw collar could not be installed properly in any case. As a result, only a two-piece collar clamp would be used in such circumstances. Additional techniques for preventing shifting and backlash included incorporating multiple spiral cuts to accommodate angular misalignment, parallel misalignment and axial motion.

When used as bearing spacers, it is important to achieve a close fit between the bearings and the clamp. If a clamp distorts and damages the shaft appreciably, the precision required for proper bearing performance is detrimentally affected. Therefore, the bearings need to be spaced an undesirable distance from the clamp in order to allow for the distortion caused thereby.

There are still further problems associated with coupling a hollow shaft onto a rotating shaft. Although set screw clamps may be the least costly, the inefficient holding force and damage to the shafts which resulted from the coupling have limited their application. Known clamping collars require serrations in the hollow shaft to allow for deformation. When the clamping force deforms the hollow shaft, the inner shaft is engaged. As a result, the hollow shaft is weakened and fine position adjustments become difficult because of the erratic deformations and common shaft damage.

In view of the above deficiencies, there is a need for improved clamp collars which permits easy installation, secures the shaft without damaging the shaft, aids in assuring adequate coupling without undesirable backlash and is easy to manufacture.

SUMMARY OF THE INVENTION

In one representative embodiment, the present disclosure provides a clamp for affixing a hollow shaft to a drive shaft. In such embodiment, the hollow shaft surrounds the drive shaft and defines opposing slots. In one representative embodiment, the clamp includes a first portion and a second portion. The first portion comprises a bridge with an outer surface and an inner surface. The inner surface of the bridge is adapted and configured to engage the drive shaft. The first portion also comprises two opposing arms, depending from the bridge. Each arm includes an inner contact face and a shoulder defining a hole for receiving a fastener. The second portion comprises an arch having an outer surface and an inner surface. The inner surface of the second portion is adapted and configured to engage the drive shaft. The second portion also includes two opposing members, upstanding from the arch portion. Each opposing member defines a bore to engage the fasteners. To assemble the first portion and the second portion about the slotted portion of the hollow shaft, the fasteners are deployed to engage the bores through the holes. As the fasteners are tightened, the first portion and the second portion are drawn together such that each inner surface couples to the hollow shaft and the first portion compresses thereby affixing the inner contact faces to the drive shaft.

In another representative embodiment, a clamp for coupling a slotted tube to a shaft is disclosed. The clamp comprises a lower portion defining a timing slot profiled to receive the slotted tube. The lower portion also defines two threaded throughbores to receive fasteners. The clamp also includes an upper portion having a depending face profiled to receive the slotted tube in a close fitting relationship. The depending face opposes the timing slot. The upper portion also includes two opposing arms for engaging the shaft and two voids intermediate the two arms and the depending face. The voids allow the two arms to flex. Further, the upper portion includes two shoulders defining throughbores. Each shoulder extends from the arms such that when the fasteners are deployed in the throughbores to couple the two threaded throughbores, the timing slot and the depending face are urged together to engage the tube and the two arms are urged together to engage the shaft.

In still another representative embodiment, a device for affixing a tube around a shaft is provided. The device comprises a first element including a middle portion for engaging the shaft. The first element also includes a first arm and a second arm depending from the middle portion in a flexible manner and a first flange integral with and inclined at an angle to the first arm. A second flange is integral with and inclined at an angle to the second arm. Both the first flange and the second flange have a hole. A second element includes a central portion which opposes the middle portion. The central portion engages the shaft. A first end, upstanding from the central portion, defines a first bore in alignment with the first hole and a second end, upstanding from the central portion, defines a second bore in alignment with the second hole, whereby, deploying a first fastener in the first hole and the first bore and employing a second fastener in the second hole and the second bore brings the first arm and the second arm closer together to engage the shaft as well as bringing the middle portion and the central portion closer together to engage the tube thereby affixing the tube to the shaft.

In another representative embodiment, a device operatively connects a tube to a shaft. The tube surrounds the shaft and the device includes a first member and a second member. The first member includes a bridge and at least two opposing arms operatively connected to the bridge. Each arm includes a shoulder, where each shoulder has a hole operatively positioned therein. The second member includes a center portion for engaging the tube and at least two opposing members. Each opposing member has a bore operatively positioned therein for engaging a fastener such that upon operatively positioning the first member and the second member relative to the tube and drawing the first member and the second member together, the tube is operatively connected to the shaft.

These and other unique features of the system disclosed herein will become more readily apparent from the following description, the accompanying drawings and the appended claims.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF THE PREFERRED EMBODIMENT

Figure 1:
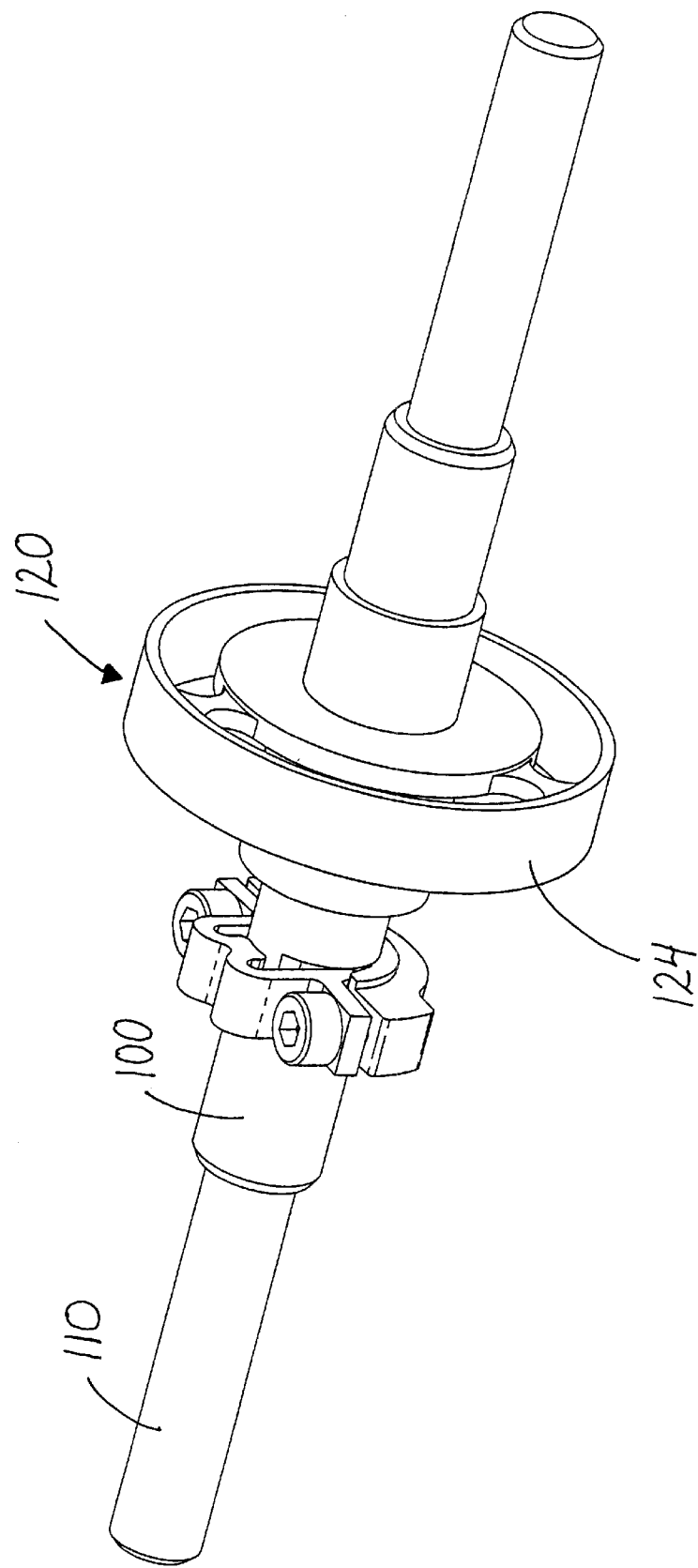
FIG. 1 is a perspective view of one representative clamp for coupling a hollow shaft to a drive shaft constructed in accordance with subject disclosure, and in particular a rotor is being coupled to a drive shaft using the clamp.

The present invention overcomes many of the problems associated with prior art collar clamps. The advantages, and other features of the apparatus, systems and methods disclosed herein, will become more readily apparent to those having ordinary skill in the art from the following detailed description of certain presently preferred embodiments taken in conjunction with the drawings which set forth representative embodiments of the disclosed clamp collars and wherein like reference numerals identify similar structural elements.

Figure 9B:
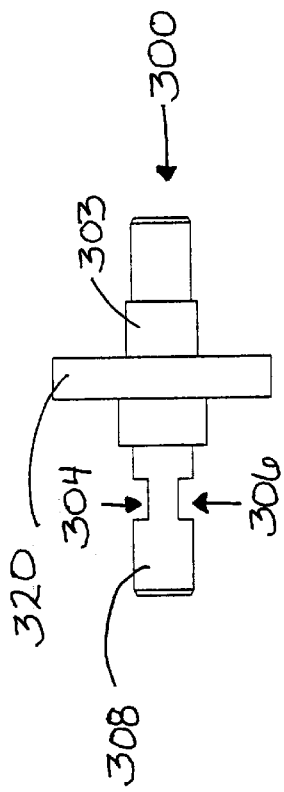
FIGS. 9A, 9B, and 9C are an end view, a side view and a cross-sectional view taken along line A—A, respectively, of a hollow shaft constructed in accordance with a representative embodiment of the subject disclosure.
Figure 9C:
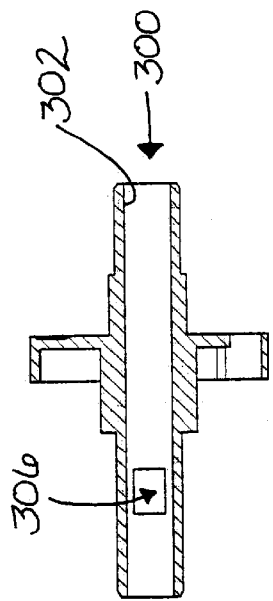
Figure 9A:
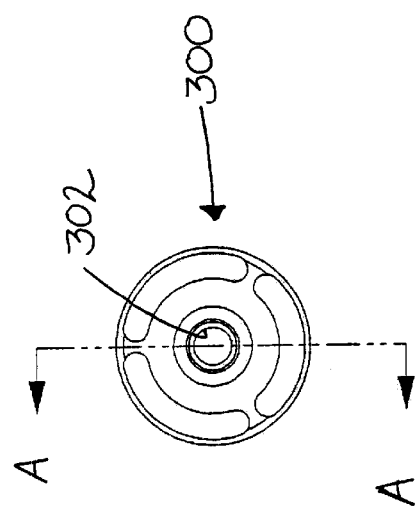

Referring to FIG. 1, one representative clamping system of the subject application, designated generally by reference numeral 130, includes a hollow shaft 100 for interlocking with a drive shaft 110. The hollow shaft 100 is integral with a device 120, such as, for example a rotor 124, pulley (not shown) and the like, as is known in the art. When the hollow shaft 100 and the drive shaft 110 are coupled, the device 120 rotates with the drive shaft 110. The hollow shaft 100 includes slots, such as shown in FIGS. 9A, 9B and 9C and designated by reference numerals 304, 306, for allowing the two-piece clamping system or clamp 130 to simultaneously contact the hollow shaft 100 and the drive shaft 110 to accomplish the desired coupling. The clamp 130 comprises at least two elements with mating surfaces and structure for generating compressive force to couple the mating surfaces to the hollow shaft 100 and the drive shaft 110. In one representative embodiment, the hollow shaft 100 has a reduced outer diameter in the area of the slots.

Figure 2:
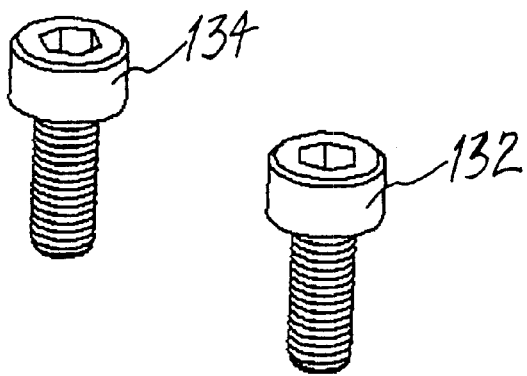
FIG. 2 is a perspective exploded view of the clamp constructed in accordance with a representative embodiment of FIG. 1.
Figure 2:
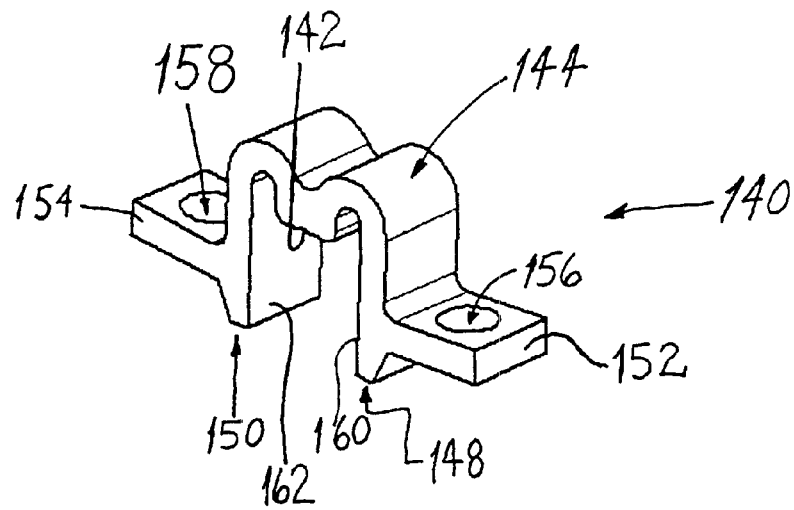
Figure 2:
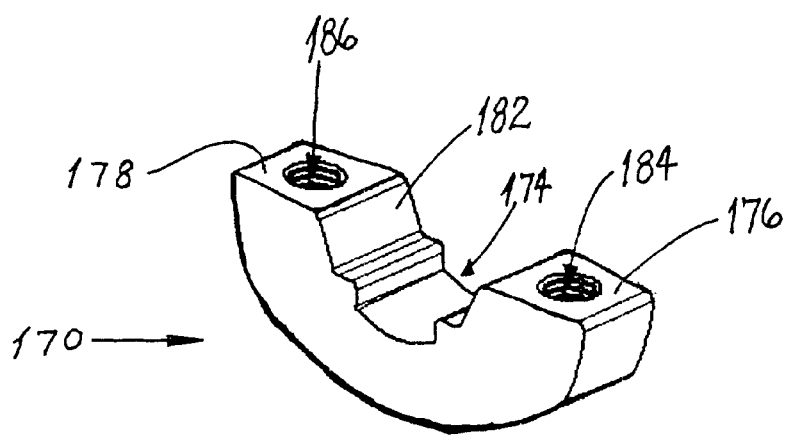
Figure 3:
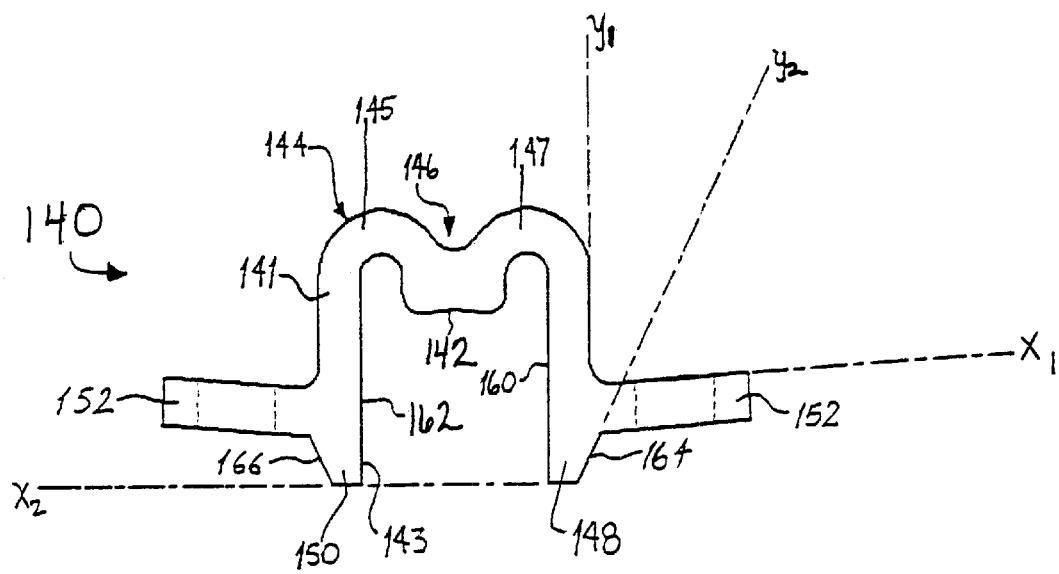
FIG. 3 is a front view of the clamp constructed in accordance with a representative embodiment of FIG. 1.
Figure 3:
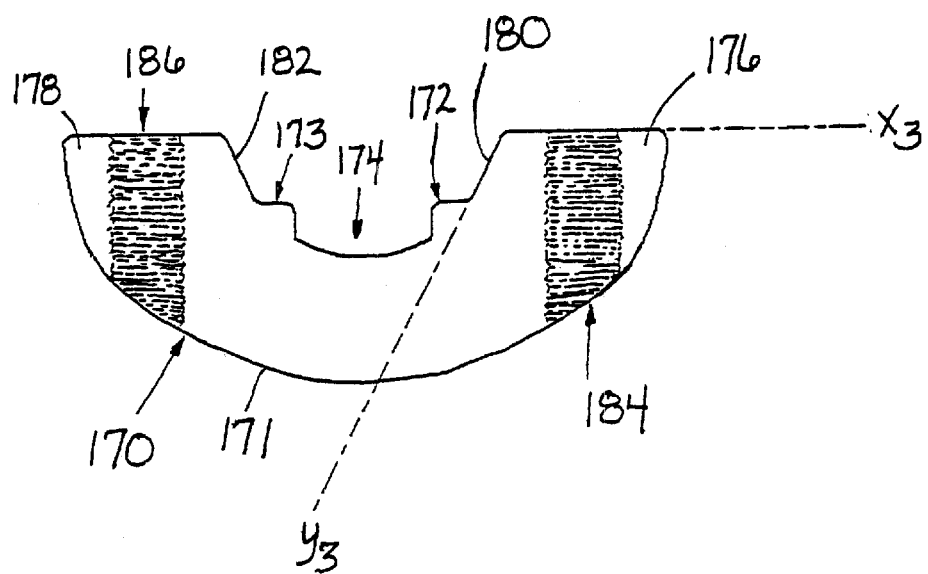

Referring to FIGS. 2 and 3, the presently preferred two elements of the clamp 130 are a top element 140 presently preferably having an m-shape and a bottom element 170, presently preferably, having a u-shape. The top element 140 and bottom element 170 are coupled together with fasteners, such as, for example, screws 132, 134 as shown in FIG. 1 or like devices that perform the fastening function as is known to those skilled in the art. The top element 140 has an outer surface 141 and an inner surface 143. A representative portion 142 of the inner surface 141 is, presently preferably, arcuate, it being understood that other shapes are acceptable as long as the function produced by portion 142 is accomplished effectively. Presently preferably, the portion 142 of inner surface 141 is of a similar radius to that of the hollow shaft 100 in order to most effectively couple thereto. The top element 140 also, presently preferably, includes a double-arched bridge portion 144. Presently preferably, a void 146 (see FIG. 3) is positioned between the two arched portions 145, 147 for increasing the flexibility of the top element 140. Two arms 148, 150, presently preferably, are operatively connected by the bridge portion 144 of top element 140. Each arm 148, 150, presently preferably, includes a tapered wing 152, 154 which includes an enlarged throughbore 156, 158 to receive fasteners, such as, for example, screws 132, 134, respectively. The arched portions 145, 147 and void 146 of bridge 144 act as a flexure to facilitate downward force on the wings 152, 154 to urge the arms 148, 150 inward, one toward the other. The arms 148, 150 include opposing inside contact faces 160, 162 for engaging the drive shaft 110.

For reference, line $y_1$ (see FIG. 3) is shown along the inside contact face 160 of arm 148. On arm 148, the top surface of the wing 152 is along line $x_1$ and forms an angle α with line $y_1$. Presently preferably, the angle α is about 86 degrees to facilitate urging the arms 148, 150 inward toward each other. Similarly, the top surface of the wing 154 on arm 150 would form a like angle. The wings 152, 154 of the depending arms 148, 150 also include an angled outside contact face 164, 166. For reference, the angled outside contact face 164 is shown along line $y_2$ on arm 148. Presently preferably, the angle β between line $y_2$ and line $x_2$ is about 245 degrees. Presently preferably, the angled outside contact face 166 of arm 150 forms a similar angle to the respective line $x_2$.

The bottom element 170, presently preferably, includes an arcuate outer circumference 171 and an inner surface 172,. A representative portion of the inner surface 172 is, presently preferably, arcuate, it being understood that other shapes are possible as long as the function of the bottom element 170 is performed adequately. The inner surface, presently preferably, defines two opposing shoulders 173 which define a timing slot 174 adapted for receiving a slotted portion of the hollow shaft 100 (see FIG. 4). In one embodiment, the timing slot 174 receives the slotted portion of the hollow shaft 100 in a close fitting relationship. In another embodiment, the timing slot 174 only partially contacts the hollow shaft 100.

The bottom element 170 also comprises two upstanding shoulders 176, 178, presently preferably, having angled inside contact faces 180, 182 for interacting with the angled outside contact faces 164, 166 of the depending arms 148, 150, respectively. For reference, the angled inside contact face 180 of shoulder 176 is shown. along line $y_3$ in FIG. 3.

Presently preferably, the angle a between line $y_3$ and line $x_3$, line $x_3$ being parallel to line $x_2$, is about 245 degrees.

Similarly, the angled inside contact face 182 on bottom element 170 would form a like angle with line $x_3$. As a result, each angled inside contact face 180, 182, presently preferably, forms complementary angles with the angled outside contact faces 164, 166 of the legs. The upstanding shoulders 176, 178 include mating structure for the fasteners, such as, for example, threaded throughbores 184, 186, shown in phantom line in FIG. 3, for engaging the screws 132, 134 when the screws 132, 134 pass therethrough. It is envisioned that structures other than screws and threaded holes may provide the coupling of the bottom element 170 to the top element 140 as long as the equivalent function is accomplished, as would be recognized by those skilled in the art upon reading the subject disclosure.

Figure 4:
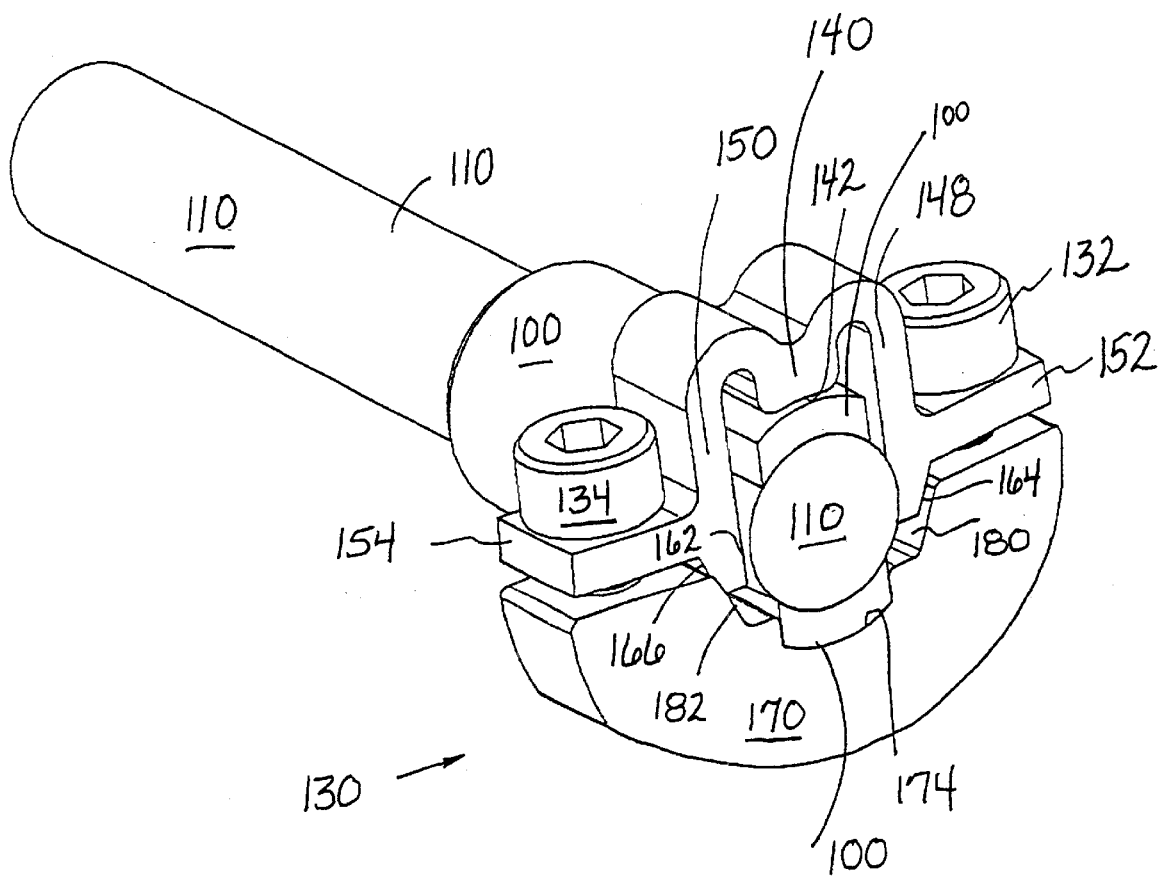
FIG. 4 is a cross-sectional view taken through the assembled clamp of FIG. 1.

Referring to FIG. 4, to assemble clamp 130, the hollow shaft 100, with a device 120 integral thereto, is slid onto the drive shaft 110. The top element 140 and the bottom element 170 are positioned to surround the hollow shaft 100 at the point of the opposing slots such as shown in FIGS. 9A, 9B and 9C and designated by reference numerals 304, 306. Initially, as the screws 132, 134 are turned into the threaded throughbores 184, 186, the top element 140 and the bottom element 170 are pulled together to create coupling of the inner surface 142 of the top element 140 and timing slot 174 of the bottom element 170 with the outer surface of the hollow shaft 100. The shape of the timing slot 174 facilitates alignment of the top element 140 and the bottom element 170 during assembly. In an alternative embodiment, a pin and corresponding bore facilitate alignment during assemble as would be readily appreciated by one skilled in the art upon reading the subject disclosure.

Upon further tightening of the screws 132, 134, a wedging mechanism is created between the angled inside contact faces 180, 182 of the bottom element 170 and the corresponding angled outside contact faces 164, 166 of the top element 140. The wedging mechanism urges the arms 148, 150 inward forcing the opposing inside contact faces 160, 162 to couple with the portion of the drive shaft 110 exposed by the opposing slots of the hollow shaft 100. Further tightening of the screws 132,134 increases the pressure on the hollow shaft 100 and drive shaft 110. Thus, the clamp 130 effectively operatively connects the hollow shaft 100 to the drive shaft 110. In a representative embodiment, only the contact between the inner surface 142 and the outer diameter of the hollow shaft 100, the timing slot 174 and the outer diameter of the hollow shaft 100, as well as the opposing inside contact faces 160,162 and the drive shaft 110 provide clamping.

In another representative embodiment, the bottom element 170 does not have an angled inside contact face with a complementary angle. Therefore, the downward pressure on the wings 152, 154 is the only force urging the arms 148, 150 inward to engage the drive shaft 110. In still another representative embodiment, the opposing inside contact faces 160, 162 of the arms 148, 150 define a hollow to increase an amount of surface area contact to the drive shaft 110.

It is presently envisioned that the top element 140 and bottom element 170 may be aluminum, stainless steel, carbon steel or any other material that could be used in a specific application. Presently preferably, the material used should provide flexibility and should support high loading with minimal deformation and fatigue related failures. As may be required, additional material, including but not limited to rubber or other similarly performing material, may be adhered to all or some of the contact points to increase the friction therebetween and provide additional flexibility to reduce fatigue related stress. In one specific embodiment, the portion 142, opposing inside contact faces 160, 162 and the timing slot 174 have rubber bonded thereto.

Presently preferably, the clamp 130 receives drive shafts 100 with diameters of about 6 mm to about 80 mm, as is common within the art, although it is noted that the clamp 130 is certainly not limited to such dimensions. Further, another embodiment, presently preferably, has a black oxide finish on the clamp for additional surface protection, i.e. preventing rust. Still further, forged socket hardware may be disposed in the threaded throughbores 184, 186 to allow for higher screw torque and, thereby, increased holding power of the clamp 130.

In still another representative embodiment, the wings 152, 154 are sufficiently thick to allow countersunk throughbores to receive screws 132, 134 to prevent catching an object and drawing the object around the drive shaft 110. It is also presently envisioned that the throughbores 156, 158 and threaded throughbores 184, 186 may be at an angle, for example parallel to line $y_2$, in order to urge the arms 148, 150 inward when deploying the screws 132, 134. In another representative embodiment, the threaded throughbores 184, 186 do not extend completely through the bottom element 170. In still another representative embodiment, the threads to engage the screws 132, 134 are located in the top element 140 and, therefore, only throughbores are required in the bottom element 170.

In another embodiment, the top element 140 and the bottom element 170 are of a single piece construction. The single piece construction may be accomplished by such methods as hinging, pinning and/or welding the top element 140 and the bottom element 170 together. The connection between the top element 140 and the bottom element 170 may be accomplished in the general area of the fasteners as would be appreciated by those skilled in the art. Additionally, the single piece construction may be monolithic and utilizes the novel concepts of the subject disclosure. For example, without limitation, a single throughbore is provided which allows insertion of a single fastener to compress the top element 140 and the bottom element 170 together.

Figure 5A:
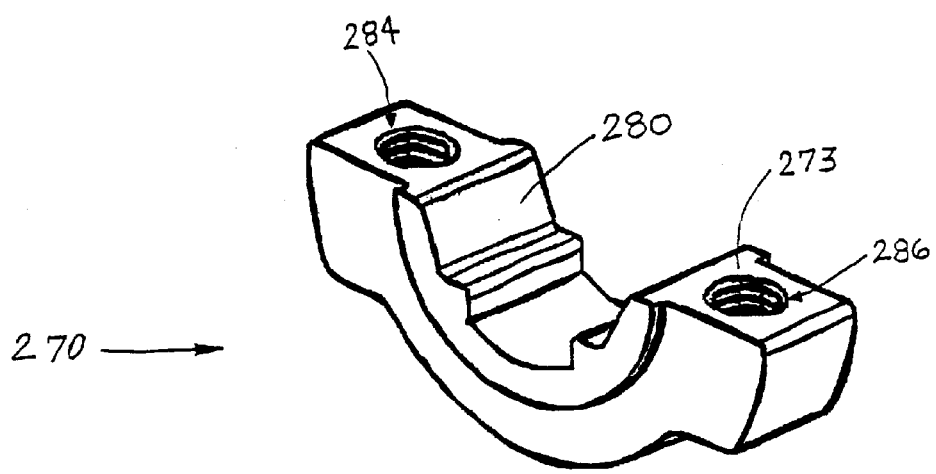
FIGS. 5A and 5B are a perspective exploded view and a front view, respectively, of another representative bottom element of a clamp constructed in accordance with another representative embodiment of the subject disclosure.
Figure 5B:
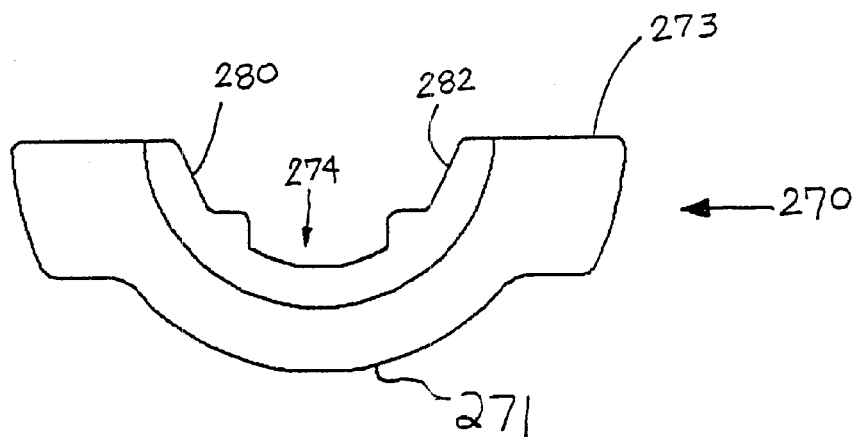

Referring now to FIGS. 5A and 5B, another, presently preferred, representative embodiment of a bottom element of the present disclosure, designated generally by reference numeral 270, for coupling with the upper element 140 is disclosed. The bottom element 270, presently preferably, includes an outer circumference 271 shaped and adapted to provide a balanced rotational load when coupled to the upper element 140. The outer circumference 271 creates a height of the bottom element in such a manner as to create symmetry with the upper element 140. Further, the thickness of bottom element 270 is partially reduced for balancing the weight with respect to the upper element 140. Thus, the resulting clamp rotates efficiently.

The bottom element also includes an inner surface 273. The inner surface defines a centrally located slot 274 profiled and adapted for receiving a slotted portion of the hollow shaft 100. The inner surface 273 also, presently preferably, includes two angled inside contact faces 280, 282 for interacting with the angled outside contact faces 164, 166 of the arms 148, 150, respectively. Each angled inside contact face 280, 282, presently preferably, forms complementary angles with the angled outside contact faces 164, 166 of the legs. The bottom element 270 includes threaded throughbores 284, 286 for engaging fasteners (not shown) to couple with the upper element 140. In one specific embodiment, the bottom element has rubber bonded to slot 274.

In operation, the top element 140 and the bottom element 270 are positioned to surround the hollow shaft 100 at the point of the opposing slots 304,306 (see FIGS. 9A, 9B, 9C). As the fasteners are operatively connected to the top element 140, the top element 140 and the bottom element 270 are pulled together to create coupling of the inner surface 142 of the top element 140 and the slot 274 of the bottom element 270 with the hollow shaft 100. Upon tightening of the fasteners, a wedging mechanism is created between the angled inside contact faces 280, 282 of the bottom element 270 and the corresponding angled outside contact faces 164, 166 of the top element 140. The wedging mechanism urges the arms 148, 150 inward forcing the opposing inside contact faces 160, 162 to couple with the portion of the drive shaft 110 exposed by the slots of the hollow shaft 100. Thus, the hollow shaft 100 is linked to the drive shaft 110.

Figure 6:
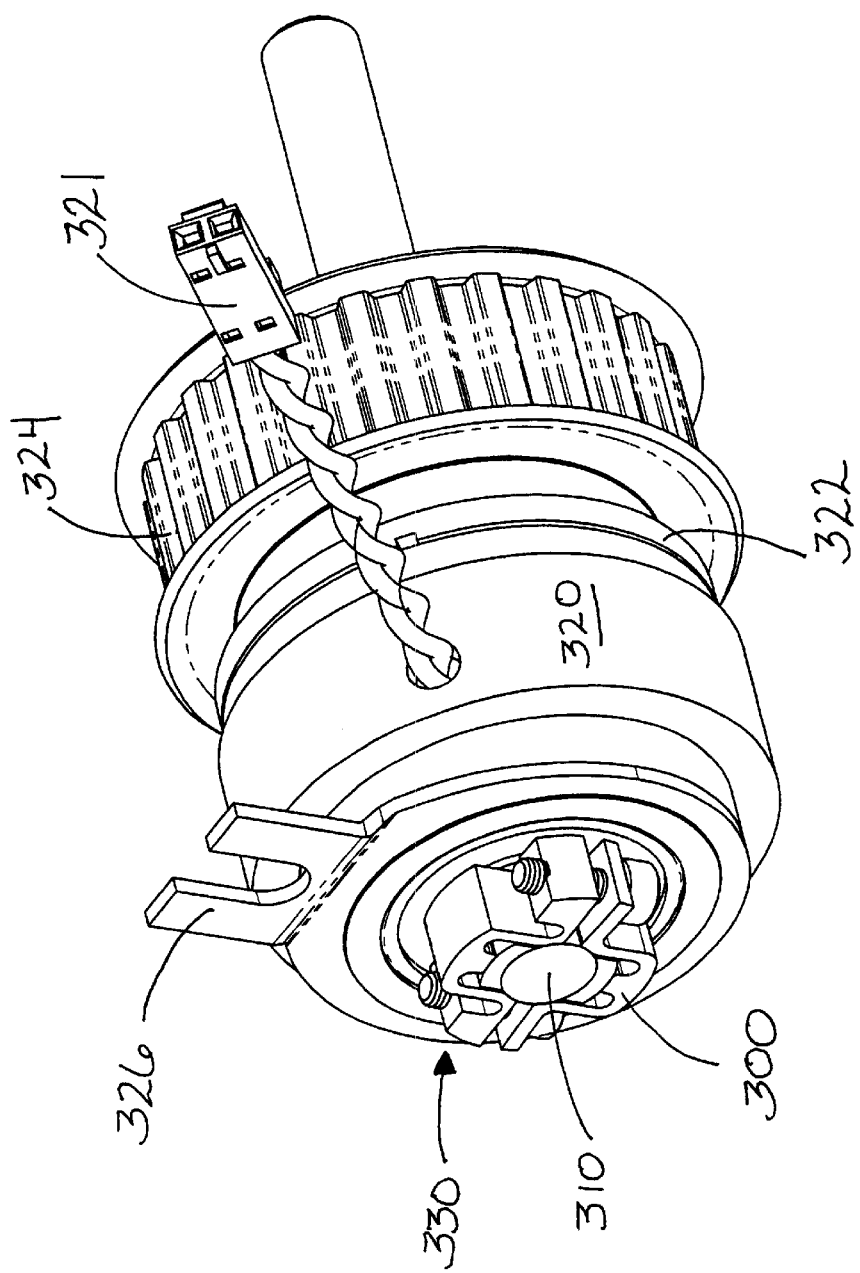
FIG. 6 is a perspective view of another representative clamp for coupling a hollow shaft to a drive shaft constructed in accordance with subject disclosure, and illustrating, in particular, using the clamp with an independently rotating bearing and pulley which are being coupled to a drive shaft only when a clutch is engaged.

Referring to FIG. 6, another representative embodiment, designated generally by reference numeral 330, operatively connects a hollow shaft 300 with a drive shaft 310. The clamp 330, as illustrated, is used as a stop to affix anyone of a plurality of devices in place on the drive shaft 310. As shown, the devices, such as a field cup 320, an armature 322, pulley 324 and the like, are integral with the hollow shaft 300. The field cup 320 has a power connector 321 for supplying power thereto. An anti-rotation tab 326 couples to a housing to facilitate clutching and/or braking as desired for the specific application.

When the hollow shaft 300 and the drive shaft 310 are coupled to one another, the device 300 rotates with the drive shaft 310. Additionally, the ball bearing of field cup 320 is fixed axially thereon by the clamp 330. The hollow shaft 300 has slots 304, 306 (see FIG. 9B) to allow the clamp 330 to simultaneously contact the hollow shaft 300 and the drive shaft 310 to accomplish the desired coupling. The representative clamp 330 includes two halves with mating surfaces and structure for generating compressive force for operatively connecting mating surfaces to the hollow shaft 300 and the drive shaft 310.

Figure 7:
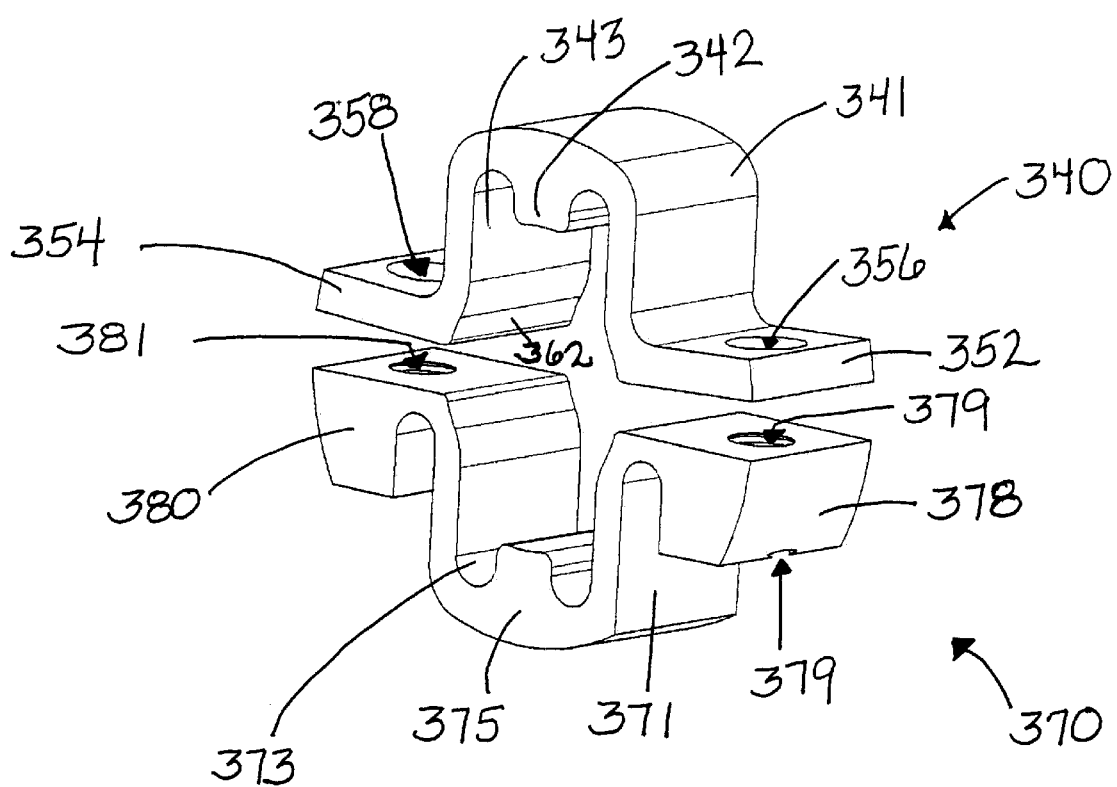
FIG. 7 is a perspective exploded view of a second representative clamp constructed in accordance with a representative embodiment of the subject disclosure.
Figure 8:
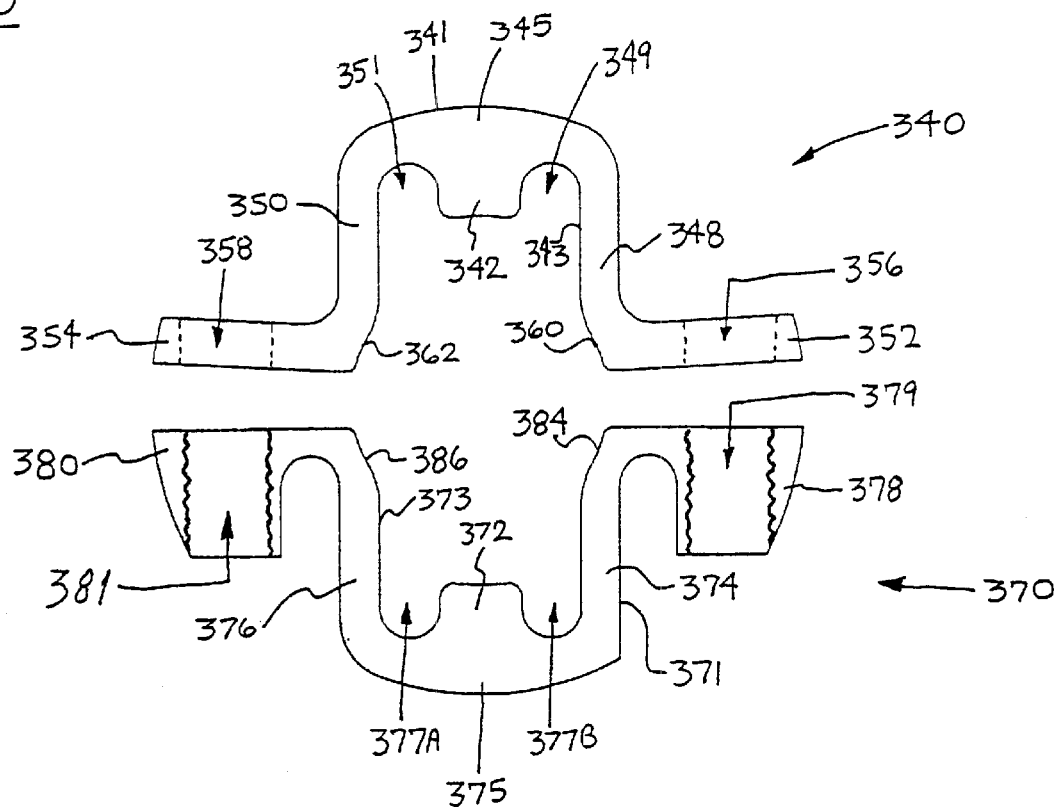
FIG. 8 is a front view of the representative clamp of FIG. 7.

Referring now to FIGS. 7 and 8, the clamp 330 comprises the upper element 340 and the lower element 370 which, when assembled, are operatively connected by fasteners. The upper element 370 has an outer surface 341 and an inner surface 343. An upper face portion 342 protrudes downward from an arched portion 345 of the upper element 340. The upper face portion 342 of inner surface 341 has, presently preferably, an arcuate shape for complementary engagement with the outer diameter of the hollow shaft 300 in order to effectively couple thereto, it being understood that the shape is not limited to arcuate and that any shape that provides the necessary function performed by the inner surface 134 would be acceptable. In one presently preferred embodiment, a piece of rubber is bonded to the upper face portion 342 in order to increase the coefficient of friction and provide additional structural flexibility to the resulting engagement with the hollow shaft 300.

Two arms 348, 350, operatively connected to the arched portion 345 of the upper element 340, include structure for engaging the drive shaft 310 and for receiving fasteners (not shown). The upper element 340 also includes two voids 349, 351 intermediate the face 342 and the arms 348, 350 for increasing the flexibility of the arms 348, 350. Each arm 348, 350 includes a transverse flange 352, 354 having means, presently preferably throughbores 356, 358 to receive fasteners, respectively. The flanges 352, 354 are, presently preferably, angled with respect to the lower element 370 so that downward force thereon urges the arms 348, 350 inward toward each other when operatively connected to the lower element 370. The arms 348, 350 have opposing inside contact faces 360, 362 for engaging the drive shaft 310. Presently preferably, the opposing inside contact faces 360, 362 have profiles that match the outer circumference of the drive shaft 310.

With continuing reference to FIGS. 7 and 8, the lower element 370 has an outer surface 371 and an inner surface 373. A lower face portion 372 protrudes upward from an arched portion of the lower element 370 to oppose the face 342 of the upper element 340 when the clamp 330 is assembled. The lower face portion 372 is also, presently preferably, of an arcuate shape for complementary engagement with the outer diameter of the hollow shaft 300 in order to effectively couple thereto. In one presently preferred embodiment, a piece of rubber is also bonded to the lower face portion 372 in order to increase the coefficient of friction and provide additional structural flexibility to the resulting engagement with the hollow shaft 300.

Two arms 374, 376, upstanding from the arched portion 375 of the lower element 370, engage the drive shaft 310 and receive fasteners. The lower element 370 also includes two voids 377A, 377B intermediate the face 372 and the arms 374, 376 for increasing the flexibility of the arms 374, 376. Each arm 374, 376 includes a transverse flange 378, 380. Each transverse flange includes threaded throughbores 379, 381 for receiving fasteners, respectively. The transverse flanges 378, 380 are, presently preferably, angled with respect to the upper element 340 so that upward force thereon urges the arms 374, 376 inward toward each other when coupled to the upper element 340. The arms 374, 376 have opposing inside contact faces 384, 386 for engaging the drive shaft 310. Presently preferably, the opposing inside contact faces 384, 386 have profiles that match the circumference of the drive shaft 310.

Referring now to FIGS. 9A, 9B and 9C, in still another representative embodiment 340, a rotor 322 is integral with the hollow shaft 300. In another embodiment, the rotor 322 is clamped thereto. Presently preferably, the hollow shaft 300 is made of steel, powder metal or the like. It is also envisioned that the hollow shaft 300 may have a coating such as black oxide. The inner diameter 302 of the hollow shaft 300 is, presently preferably, sized and configured to surround the drive shaft 310 in a close fitting manner. The outer surface 303 of the hollow shaft 300 varies in diameter. A portion 308 of the hollow shaft 300 defines slots 304, 306 for allowing a portion of the clamp 330 (see FIG. 10) to fixably engage the drive shaft 310. The portion 308 has a smaller outer diameter 310 than the remainder of the hollow shaft 300.

Figure 10:
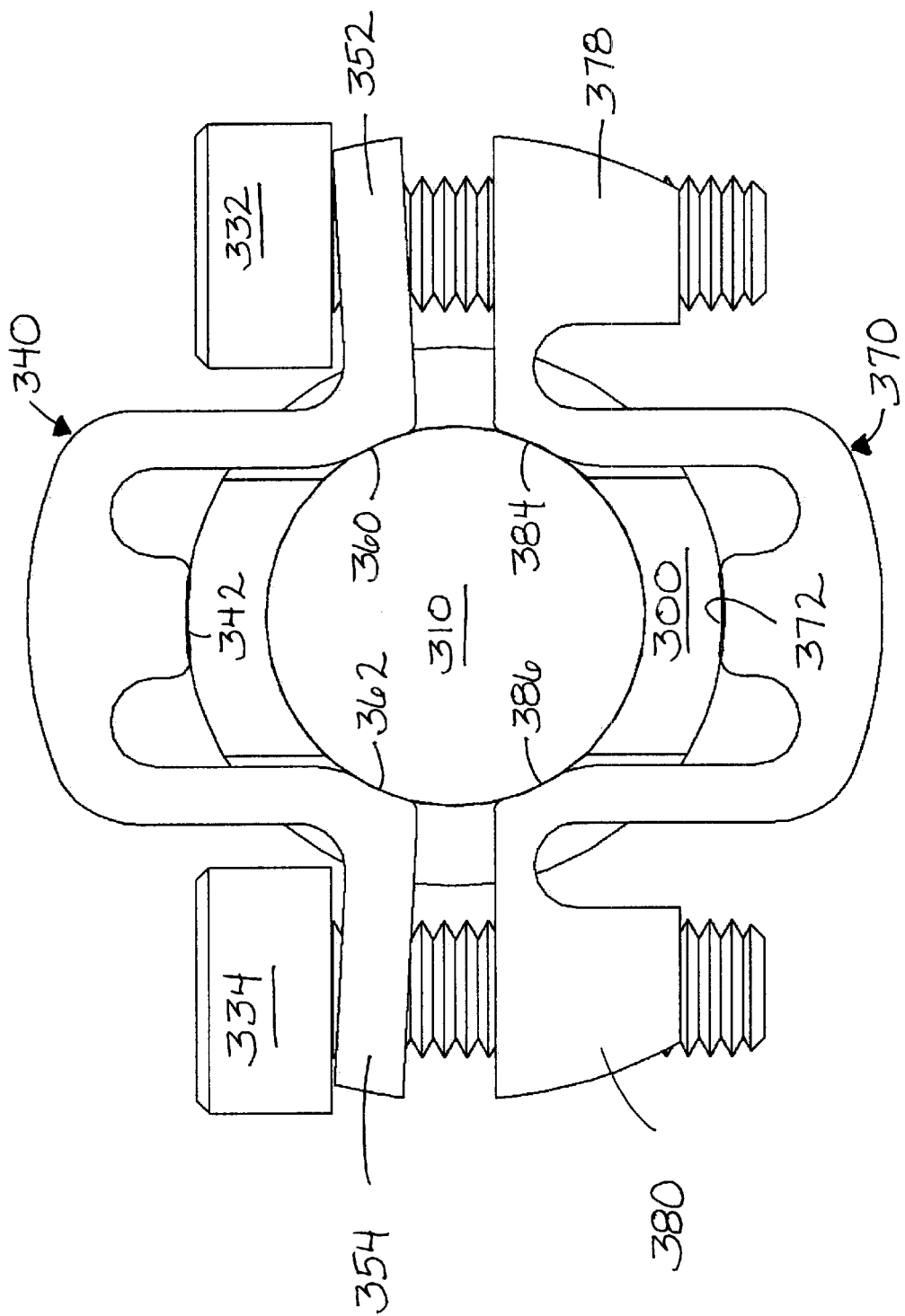
FIG. 10 is a cross-sectional view taken through the assembled clamp of FIG. 6.

Referring now to FIG. 10, to assemble clamp 330, the hollow shaft 300 is slid onto the drive shaft 310. The upper element 340 and the lower element 370 couple together with fasteners at the point of the opposing slots 304, 306 of the hollow shaft 300. As the fasteners 332, 334 are turned into the, presently preferred, threaded throughbores 379, 381, the upper element 340 and the lower element 370 are pulled together until the opposing faces 342, 372 contact the hollow shaft 300. Upon further tightening of the fasteners 332, 334, the flanges 352, 354 of the upper portion 340 and the flanges 378, 380 of the lower portion 370 are urged closer together. The force generated by urging the upper flanges 352, 354 towards the lower flanges 378, 380 moves the opposing inside contact faces 360, 362 of the upper portion 340 together until contacts are made with the drive shaft 310. Concurrently, the opposing inside contact faces 384, 386 of the lower portion are urged closer together until contacts are made with the drive shaft 310. Further, the pressure increases on the drive shaft 310 from the opposing inside contact faces 360, 362, 384, 386. Thus, the force with which the clamp 330 anchors the hollow shaft 300 to the drive shaft 310 varies with the torque applied to the fasteners 332, 334.

Figure 11:
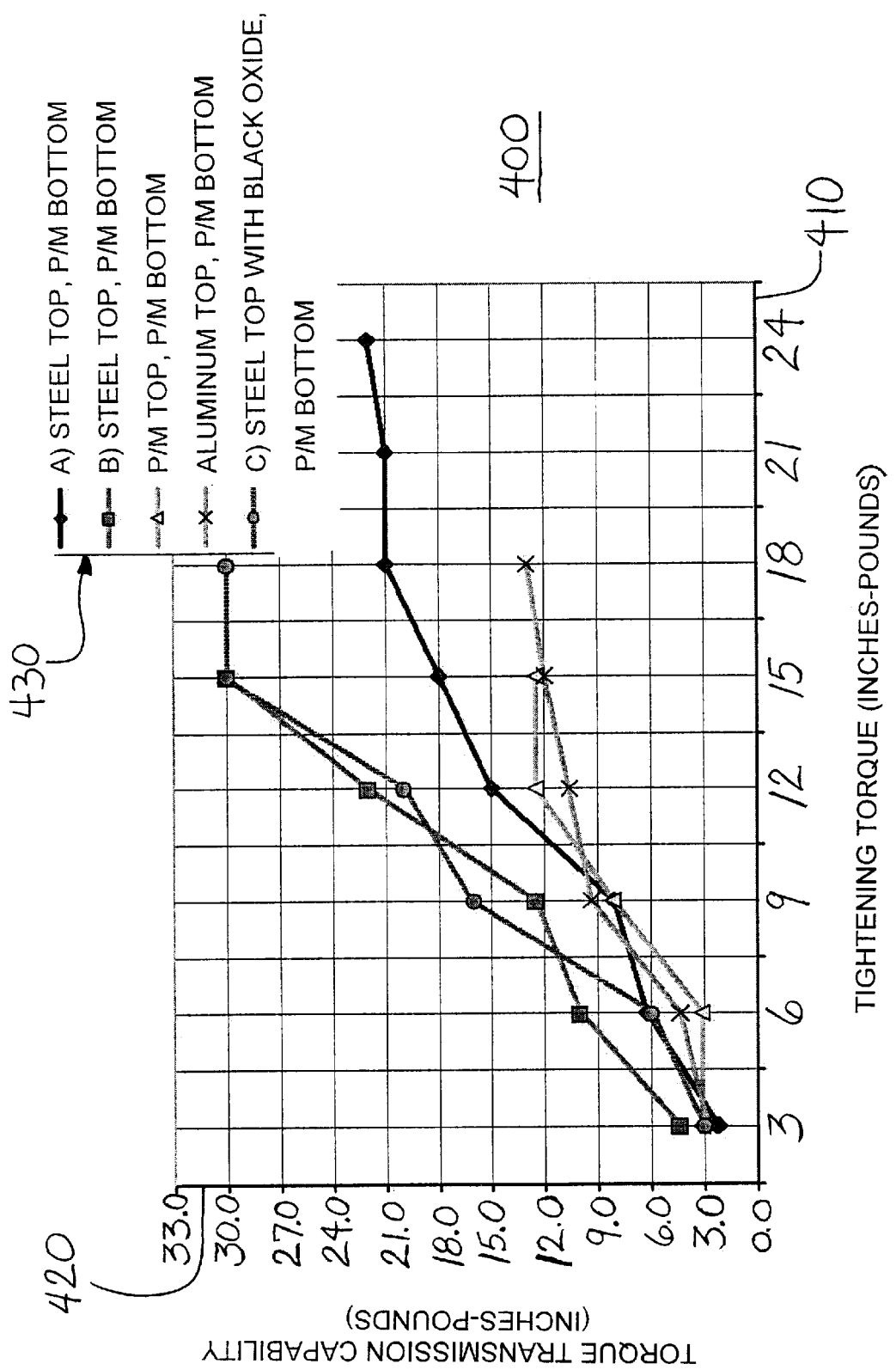
FIG. 11 is a graph depicting Tightening Torque versus Holding Ability for a clamp constructed in accordance with one representative embodiment of the subject disclosure.

Referring to FIG. 11, the efficiency with which the torque applied during tightening of the clamps constructed in accordance with the subject disclosure is illustrated by graph 400. Graph 400 includes tightening torque in inch pounds on the horizontal axis 410 and torque transmission capability in inch-pounds on the vertical axis 420. Clamps fabricated from five different materials are represented in legend 430 with corresponding lines on graph 400. As can be seen in graph 400, although an aluminum top element and powder metal bottom element perform satisfactorily, fabricating the top element from steel and coating it with black oxide yields enhanced performance results. It is also envisioned that both elements could be fabricated from steel and coated with black oxide as well as other combinations as would be readily appreciated by one skilled in the art upon review of the subject disclosure.

It will be appreciated by those skilled in the art that the representative clamps herein may be utilized as bearing spacers and the like. In another representative embodiment, the devices are integral with the clamp, thereby, the need for the hollow shaft is removed. In still another representative embodiment, the clamps herein may also be used as slip clutches as would be readily appreciated by those skilled in the art. As is known to one skilled in the art, a slip clutch engages a shaft up to a certain torque, at such time, the shaft decouples from the slip clutch and is free to rotate.

While the invention has been described with respect to representative embodiments, those skilled in the art will readily appreciate that various changes and/or modifications can be made to the invention without departing from the spirit or scope of the invention as defined by the appended claims.

What is claimed is:

1. A system for clamping a shaft, the system comprising:
   (a) a hollow shaft sized and configured to operatively slide onto the shaft, the hollow shaft having opposing slots;
   (b) a first portion comprising:
   a bridge; and
   a first arm and a second arm which oppose each other, each arm depending from the bridge and having an inner contact face, where the first arm has a shoulder, the shoulder including a first structure for receiving a first fastener; and
   (c) a second portion comprising:
   an inner surface adapted and configured to engage the hollow shaft; and
   a first member and a second member which oppose each other, the first member including a second structure for receiving the first fastener such that upon placing the first portion and the second portion about the opposing slots of the hollow shaft, deploying the first fastener draws the first portion and the second portion together such that the inner surface couples to the hollow shaft and the first portion compresses thereby affixing the inner contact faces of the first and second arms to a portion of the shaft exposed by the opposing slots.

2. The system of claim 1, wherein the first portion and the second portion are of a single piece construction.

3. The system of claim 1, wherein the second arm has an inner contact face and a shoulder, the shoulder of the second arm including a structure for receiving a second fastener and the second member has a structure for receiving the second fastener such that upon deploying the second fastener, the first portion and the second portion draw together to further facilitate the inner surface coupling to the hollow shaft and the first portion compressing.

4. The system of claim 3, further comprising:
an angled outer contact face integral with each arm; and
an angled inner contact face integral with each member, wherein the angled outer contact faces and the angled inner contact faces are substantially complementary, respectively, to compress the first portion upon deploying the first and second fasteners.

5. The system of claim 3, further comprising:
an inner contact surface integral with the inner surface of each member such that upon deploying the first and second fasteners, the inner contact surfaces effectively couple to the shaft.

6. The system of claim 5, wherein the inner contact surfaces of the members define a hollow for a complementary engagement with the shaft, wherein a material is bonded to the hollow.

7. The system of claim 3, wherein the bridge defines a void to provide for flexibility thereof.

8. The system of claim 3, wherein an outer surface, opposing the inner surface, is adapted and configured such that the clamp is well-balanced when assembled.

9. The system of claim 3, further comprising an inner surface on the bridge, the inner surface adapted and configured to engage the hollow shaft, wherein when the first and second fasteners are deployed, the inner surface of the bridge couples to the hollow shaft.

10. The system of claim 1, wherein the system is a slip clutch.

11. The system of claim 1, further comprising devices operatively associated with the hollow shaft.

12. A clamp for coupling a slotted tube to a shaft, comprising:
(a) a lower portion defining:
  a slot profiled to operatively receive the slotted tube; and
  structure for receiving fasteners; and
(b) an upper portion having:
  a depending face profiled to operatively receive the slotted tube, the depending face opposing the slot;
  two opposing arms for engaging the shaft, the upper portion defining two voids intermediate the two arms and the depending face to allow the two arms to flex; and
  two shoulders including structure for receiving the fasteners, each shoulder extending from the arms such that when the fasteners are deployed therein to couple the upper portion and the lower portion, the slot and the depending face engage the tube and the two arms are urged together to engage the shaft.

13. The clamp of claim 12, further comprising an angled inner surface integral with the lower portion and an angled outer surface integral with the upper portion for generating an inward urging force on the two opposing arms when the fasteners are deployed.

14. The clamp of claim 12, wherein the lower portion defines two hollows for engaging the shaft and each of the opposing arms defines a contact portion for engaging the shaft.

15. A device for affixing a tube around a shaft, comprising:
a first element including: a middle portion for engaging the shaft; a first arm and a second arm depending from the middle portion in a flexible manner; a first flange integral with and inclined at an angle to the first arm, the first flange having a first hole; and a second flange integral with and inclined at an angle to the second arm, the second flange having a second hole; and
a second element including: a central portion, opposing the middle portion, for engaging the shaft; a first end, upstanding from the central portion, defining a first bore in alignment with the first hole; and a second end, upstanding from the central portion, defining a second bore in alignment with the second hole whereby deploying a first fastener in the first hole and the first bore and employing a second fastener in the second hole and the second bore brings the first arm and the second arm closer together to engage the shaft as well as bringing the middle portion and the central portion closer together to engage the tube thereby affixing the tube to the shaft.

16. The device of claim 15, wherein the middle portion defines two outer voids and a third void intermediate and opposing the two outer voids in order to increase lateral flexibility of the first arm and the second arm.

17. The device of claim 15, further comprising a contact face, depending from the middle portion, the contact face having a lower profile to match an outer diameter of the tube and a material bonded thereto.

18. The device of claim 15, wherein the first arm defines a first hollow which complements an outer diameter of the shaft and the second arm defines a second hollow which complements an outer diameter of the shaft.

19. The device of claim 15, further comprising a sloping surface at an end of the first arm and a sloping surface at an end of the second arm, whereby upon deployment of the fasteners the sloping surfaces are urged inward by complementary inner surfaces of the second element.

20. The device of claim 15, wherein the central portion defines a surface to engage the tube.

21. The device of claim 15, wherein the device is fabricated from a material selected-from the group consisting of bare steel, bare steel with black oxide, powder metal, aluminum, anodized aluminum and combinations thereof.

22. The device of claim 15, further comprising a contact face, extending from the central portion, having a profile to match an outer diameter of the tube.

23. The device of claim 15, wherein the first end defines a first hollow which complements an outer diameter of the shaft and the second end defines a second hollow which complements an outer diameter of the shaft, wherein the first end defines a void intermediate the first bore and the first hollow and the second end defines a void intermediate the second bore and the second hollow, each void for increasing a flexibility of the respective end.

24. A method for linking a hollow shaft having opposing slots to a shaft, the method comprising the steps of:
sliding the hollow shaft about the shaft;
aligning a top element and a bottom element about the hollow shaft intermediate the opposing slots such that arms of the top element are in contact with the shaft and an inner central surface of the top element and an inner central surface of the bottom element are in contact with an outside surface of the hollow shaft; and
coupling the top element to the bottom element with fasteners such that as the top element and the bottom element are pulled together, the inner central surface of the bottom element engages the hollow shaft and a wedging mechanism is created between angled inside contact faces of the bottom element and the arms of the top element, wherein the wedging mechanism urges the arms of the top element inward forcing opposing inside contact faces of the arms to couple with a portion of the shaft exposed by the opposing slots of the hollow shaft.

* * * * *